United States Patent
O et al.

(10) Patent No.: US 11,159,040 B2
(45) Date of Patent: Oct. 26, 2021

(54) ELECTRONIC DEVICE AND POWER CONTROL METHOD FOR WIRELESS CHARGING

(71) Applicant: Samsung Electronics Co., Ltd., Suwon-si (KR)

(72) Inventors: Changhak O, Suwon-si (KR); Kwangseob Kim, Suwon-si (KR); Dongzo Kim, Suwon-si (KR); Mincheol Ha, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/594,575

(22) Filed: Oct. 7, 2019

(65) Prior Publication Data

US 2020/0119578 A1  Apr. 16, 2020

(30) Foreign Application Priority Data

Oct. 12, 2018 (KR) .................. 10-2018-0122175

(51) Int. Cl.
*H02J 50/12* (2016.01)
*H02J 7/02* (2016.01)
(Continued)

(52) U.S. Cl.
CPC .............. *H02J 7/025* (2013.01); *H02J 50/12* (2016.02); *H02J 50/70* (2016.02); *H02J 50/80* (2016.02); *H02M 7/5387* (2013.01)

(58) Field of Classification Search
CPC .. H02J 7/025; H02J 50/80; H02J 50/70; H02J 50/12; H02J 7/342; H02J 50/10;
(Continued)

(56) References Cited

U.S. PATENT DOCUMENTS 10,418,857 B2    9/2019 Kim et al.
2014/0028244 A1  1/2014 Korekoda
(Continued)

FOREIGN PATENT DOCUMENTS

KR   10-2018-0002997 A   1/2018
KR   10-2018-0062653 A   6/2018
(Continued)

OTHER PUBLICATIONS

International Search Report dated Jan. 22, 2020, issued in an International Application No. PCT/KR2019/013291.
(Continued)

*Primary Examiner* — Nghia M Doan
(74) *Attorney, Agent, or Firm* — Jefferson IP Law, LLP

(57) ABSTRACT

A power control method for wireless charging and an electronic device therefor are provided. The electronic device, includes a coil, an inverter including gate inputs which are electrically connected to the coil, and at least one processor. The at least one processor is configured to control the gate inputs of the inverter in an anti symmetric manner to generate an output power, receive an output power reduction request from an external electronic device, based on receiving the output power reduction request, determine whether a ratio of ON-operations to OFF-operation of the gate inputs of the inverter is less than or equal to a designated ratio, and based on the ratio of ON-operations to OFF-operations of the gate inputs of the inverter being less than or equal to the designated ratio, modulate a phase of a voltage input into the gate inputs of the inverter to generate an output power.

19 Claims, 13 Drawing Sheets

(51) Int. Cl.
*H02J 50/80* (2016.01)
*H02J 50/70* (2016.01)
*H02M 7/5387* (2007.01)

(58) Field of Classification Search
CPC ............. H02M 7/5387; H02M 7/4815; H02M 7/53878; H02M 7/53875; Y02B 70/10
See application file for complete search history.

(56) References Cited

U.S. PATENT DOCUMENTS

| | | | |
|---|---|---|---|
| 2014/0104898 A1* | 4/2014 | Yeo | ................. H02J 50/12 363/37 |
| 2017/0018965 A1 | 1/2017 | Lee et al. | |
| 2018/0062443 A1 | 3/2018 | Cho et al. | |
| 2018/0152058 A1 | 5/2018 | Lee et al. | |
| 2019/0214852 A1 | 7/2019 | Park | |

FOREIGN PATENT DOCUMENTS

| KR | 10-2018-0092554 A | 8/2018 |
|---|---|---|
| KR | 10-2018-0103036 A | 9/2018 |

OTHER PUBLICATIONS

Extended European Search Report dated Jul. 5, 2021, issued in European Patent Application No. 19870530.3.

* cited by examiner

ELECTRONIC DEVICE AND POWER CONTROL METHOD FOR WIRELESS CHARGING

CROSS-REFERENCE TO RELATED APPLICATION(S)

This application is based on and claims priority under 35 U.S.C. § 119 of a Korean patent application number 10-2018-0122175, filed on Oct. 12, 2018, in the Korean Intellectual Property Office, the disclosure of which is incorporated by reference herein in its entirety.

BACKGROUND

1. Field

The disclosure relates to a power control method for wireless charging and an electronic device including the method.

2. Description of Related Art

Recently, various application products are being released, which are capable of supporting an operation of charging various electronic products using a charging pad using a wireless charging system (e.g., a magnetic induction scheme or a resonance scheme), and are capable of supporting an operation of charging various electronic products using a mobile terminal.

The above information is presented as background information only to assist with an understanding of the disclosure. No determination has been made, and no assertion is made, as to whether any of the above might be applicable as prior art with regard to the disclosure.

SUMMARY

As various application products have been released, there is a desire for improvement of an electromagnetic interference phenomenon while wireless charging with various electric power is supported.

Aspects of the disclosure are to address at least the above-mentioned problems and/or disadvantages and to provide at least the advantages described below. Accordingly, an aspect of the disclosure is to provide a wireless charging power control method which can reduce electromagnetic interference during wireless power transmission, and an electronic device that implements the method.

Additional aspects will be set forth in part in the description which follows and, in part, will be apparent from the description, or may be learned by practice of the presented embodiments.

In accordance with an aspect of the disclosure, an electronic device is provided. The electronic device includes a coil, an inverter including a plurality of gate inputs which are electrically connected to the coil, and at least one processor configured to control the plurality of gate inputs of the inverter in an anti-symmetric manner to generate output power, receive an output power reduction request from an external electronic device, based on receiving the output power reduction request, determine whether a ratio of ON-operations to OFF-operation of the plurality of gate inputs of the inverter is less than or equal to a designated ratio, and based on the ratio of ON-operations to OFF-operations of the plurality of gate inputs of the inverter being less than or equal to the designated ratio, modulate a phase of a voltage input into the plurality of gate inputs of the inverter to generate output power.

In accordance with another aspect of the disclosure, a power control method for wireless charging of an electronic device is provided. The power control method includes generating an output power by controlling a plurality of gate inputs of an inverter in an anti-symmetric manner, receiving an output power reduction request from an external electronic device, based on the output power reduction request being received, determining whether a ratio of ON-operations to OFF-operations of the plurality of gate inputs of the inverter is less than or equal to a designated ratio, and based on the ratio of ON-operations to OFF-operations of the plurality of gate inputs of the inverter being less than or equal to the designated ratio, generating an output power by modulating a phase of a voltage input to the plurality of gate inputs of the inverter.

In accordance with another aspect of the disclosure, an electronic device is provided. The electronic device includes a coil, an inverter including a plurality of gate inputs electrically connected to the coil, and at least one processor configured to generate output power having a first frequency by controlling an input voltage to enable the inverter to perform ON-operations and OFF-operations in the same proportion, receive a request for reducing the output power from an external electronic device, based the request for reducing the output power being received, generate an output power having a first frequency by controlling an input voltage to enable the inverter to perform ON-operations and OFF-operations in different proportions, and transmit the output power to the external electronic device via the coil.

A power control method for wireless charging according to various embodiments and an electronic device that implements the method may control power to be transmitted when transmitting wireless power, so as to reduce electromagnetic interference.

A power control method for wireless charging according to various embodiments and an electronic device that implements the method may control power to be transmitted when transmitting wireless power, so that disconnection of power may be reduced when low-power transmission is performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
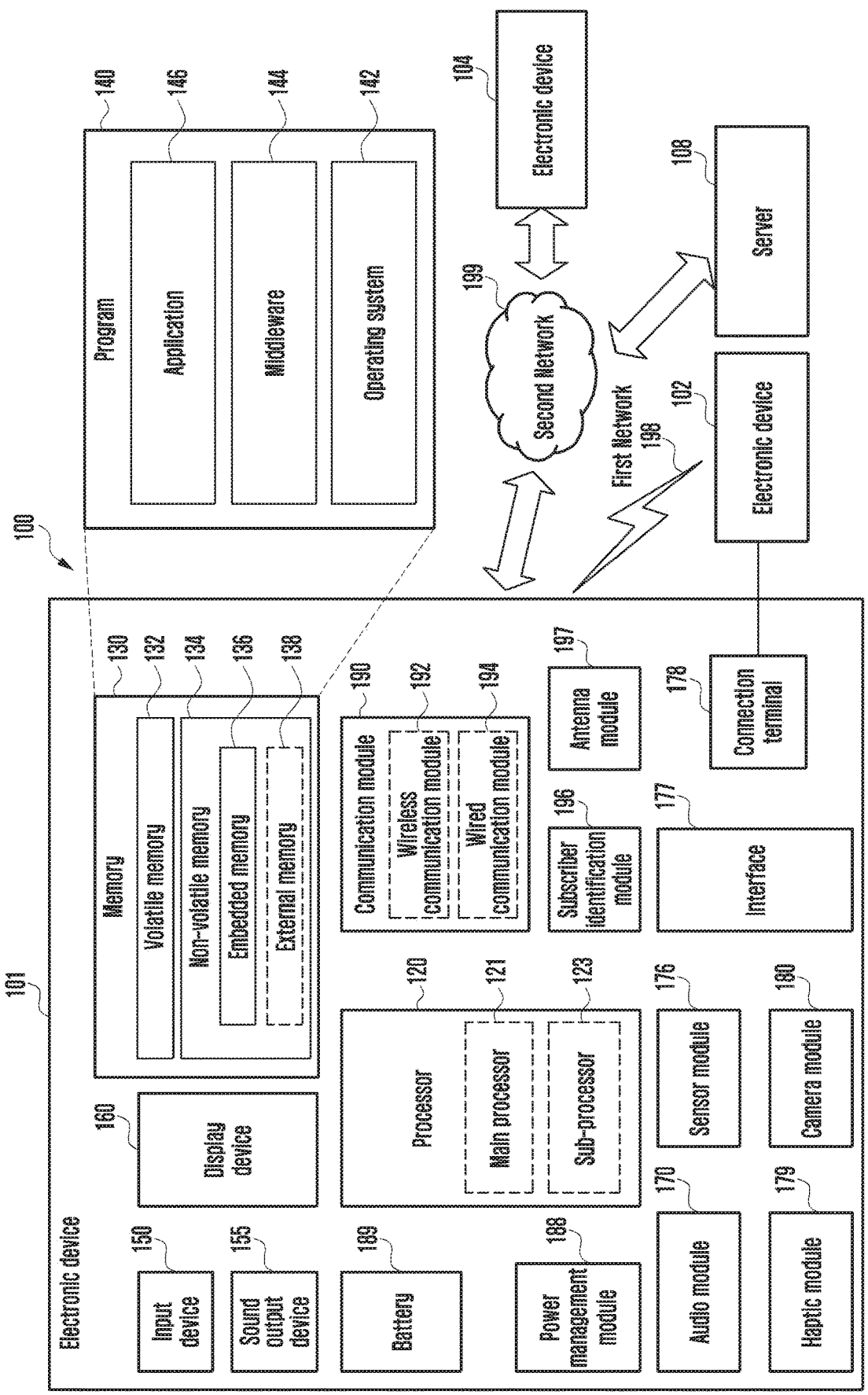
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
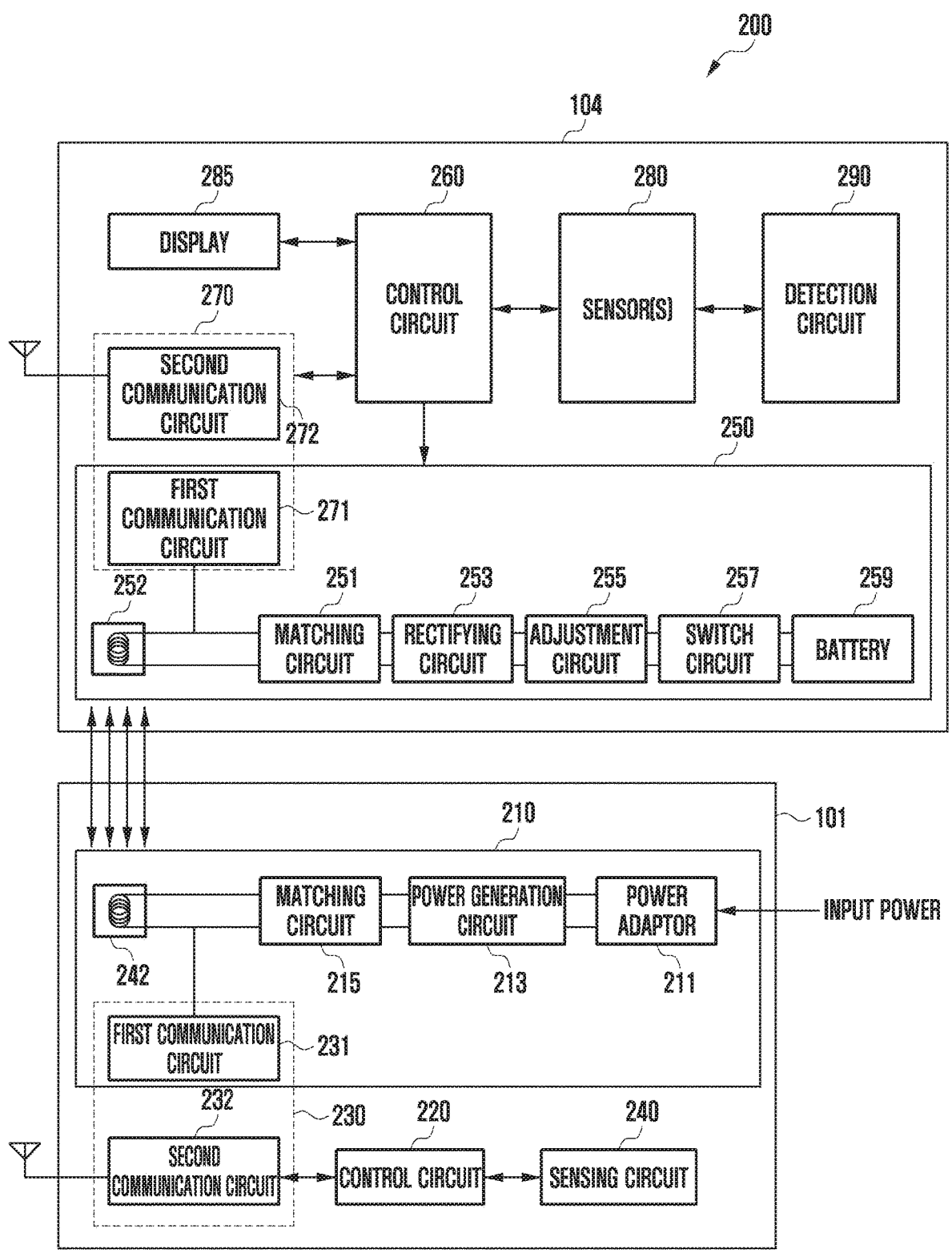
FIG. 2A is a diagram illustrating a wireless charging environment of an electronic device and an external electronic device according to an embodiment of the disclosure.

FIG. 2A is a diagram illustrating a wireless charging environment 200 of an electronic device and an external electronic device (e.g., watch or earbud) according to an embodiment of the disclosure.

Referring to FIG. 2A, the electronic device 101 according to various embodiments (e.g., the electronic device 101 of FIG. 1) may transmit power to an external electronic device 104 (e.g., a watch or an earbud) in the wireless manner, and may perform charging. The external electronic device 104 may receive power in the wireless manner.

According to various embodiments, the electronic device 101 may include a power transmission circuit 210, a control circuit 220, a communication circuit 230 (e.g., a transceiver), and/or a sensing circuit 240.

According to various embodiments, the power transmission circuit 210 may include: a power adaptor 211 that receives power supply (or power) from the outside and appropriately converts the voltage of the input power; a power generation circuit 213 that generates power; and/or a matching circuit 215 that maximizes the efficiency between a transmission coil 242 and a reception coil 252.

According to various embodiments, the power transmission circuit 210 may include multiples entities corresponding to at least some among the power adaptor 211, the power generation circuit 213, the matching circuit 215, or the transmission coil 242, so as to transmit power to a plurality of external electronic devices (e.g., a watch, an earbud, or the like).

According to various embodiments, the power transmission circuit 210 may generate a first signal of a first frequency for providing a first power to, for example, a watch, and may generate a second signal of a second frequency for providing a second power to, for example, an earbud, using the power generation circuit 213.

According to various embodiments, the control circuit 220 may control the electronic device 101 overall, may generate various messages needed for wireless power transmission, and may transfer the same to the communication circuit 230. According to an embodiment, the control circuit 220 may obtain power (or electric energy) to be transmitted to the external electronic device 104 on the basis of information received from the communication circuit 230. According to an embodiment, the control circuit 220 may control the power transmission circuit 210 so that power obtained by the transmission coil 242 is transmitted to the external electronic device 104.

According to various embodiments, in order to transmit power to each of a plurality of external electronic devices (e.g., a watch and an earbud), the control circuit 220 may control the power generation circuit 213 so as to generate a first signal of a first frequency for providing a first power to, for example, a watch and to generate a second signal of a second frequency for providing a second power to, for example, an earbud.

According to various embodiments, the communication circuit 230 may include at least one of a first communication circuit 231 and a second communication circuit 232. The first communication circuit 231 may communicate with a first communication circuit 271 of the external electronic device 104 according to, for example, an inband scheme using the same frequency as a frequency that the transmission coil 242 uses for power transmission. According to an embodiment, the second communication circuit 232 may communicate with a second communication circuit 272 of the external electronic device 104 according to, for example, an outband scheme using a frequency different from a frequency that the transmission coil 242 uses for power transmission. For example, the second communication circuit 232 may obtain information (e.g., Vrec information, Tout information, various packets, messages, or the like) related to a charging state from the second communication circuit 272 using one of the various short-range communication schemes, such as Bluetooth, Bluetooth low energy (BLE), Wi-Fi, and near field communication (NFC).

According to various embodiments, the sensing circuit 240 may include at least one sensor, and may sense at least one state of the external electronic device 104 using the at least one sensor.

According to various embodiments, the sensing circuit 240 may include at least one of a temperature sensor, a motion sensor, or a current (or voltage) sensor. The temperature sensor may sense the temperature of the electronic device 101. The motion sensor may sense the motion of the electronic device 101. The current (or voltage) sensor may sense the state of an output signal of the electronic device 101, for example, the magnitude of a current, the magnitude of a voltage, or the magnitude of power.

According to various embodiments, the current (or voltage) sensor may measure a signal in at least a partial area of the power transmission circuit 210. For example, the current (or voltage) sensor may include a circuit for measuring a signal at the front end of the transmission coil 242. According to various embodiments, the sensing circuit 240 may be a circuit for foreign object detection (FOD).

According to various embodiments, the external electronic device 104 (e.g., a watch or an earbud) that receives power output from the electronic device 101 may include a power reception circuit 250, a control circuit 260, a communication circuit 270 (e.g., a transceiver), at least one sensor 280, a display 285, and/or a detection circuit 290. According to various embodiments, a description of some of the elements of the external electronic device 104 corresponding to those of the electronic device 101 may be omitted.

According to various embodiments, the power reception circuit 250 may include the reception coil 252 for receiving power from the electronic device 101 in the wireless manner, a matching circuit 251, a rectifying circuit 253 for rectifying received AC power to DC power, an adjustment circuit 255 for adjusting a charging voltage, a switch circuit 257, and/or a battery 259.

According to various embodiments, the control circuit 260 may control the external electronic device 104 overall, may generate various messages needed for wireless power reception, and may transfer the same to the communication circuit 270.

According to various embodiments, the communication circuit 270 may include at least one of the first communication circuit 271 and the second communication circuit 272. The first communication circuit 271 may communicate with the electronic device 101 via the reception coil 252. The second communication circuit 272 may communicate with the electronic device 101 using one of the various short-range communication schemes, such as Bluetooth, BLE, Wi-Fi, or NFC.

According to various embodiments, at least one sensor 280 may include at least some of a current/voltage sensor, a temperature sensor, an illuminance sensor, or a sound sensor.

According to various embodiments, the display 285 may display various types of display information required for wireless power transmission/reception.

According to various embodiments, the detection circuit 290 may detect an exploration signal or power received from the electronic device 101, and may detect the electronic device 101. The detection circuit 290 may receive a signal output from the electronic device 101 via the reception coil 252, and may detect a change of a signal at an input/output end of the matching circuit 251 or the rectifying circuit 253.

Figure 2B:
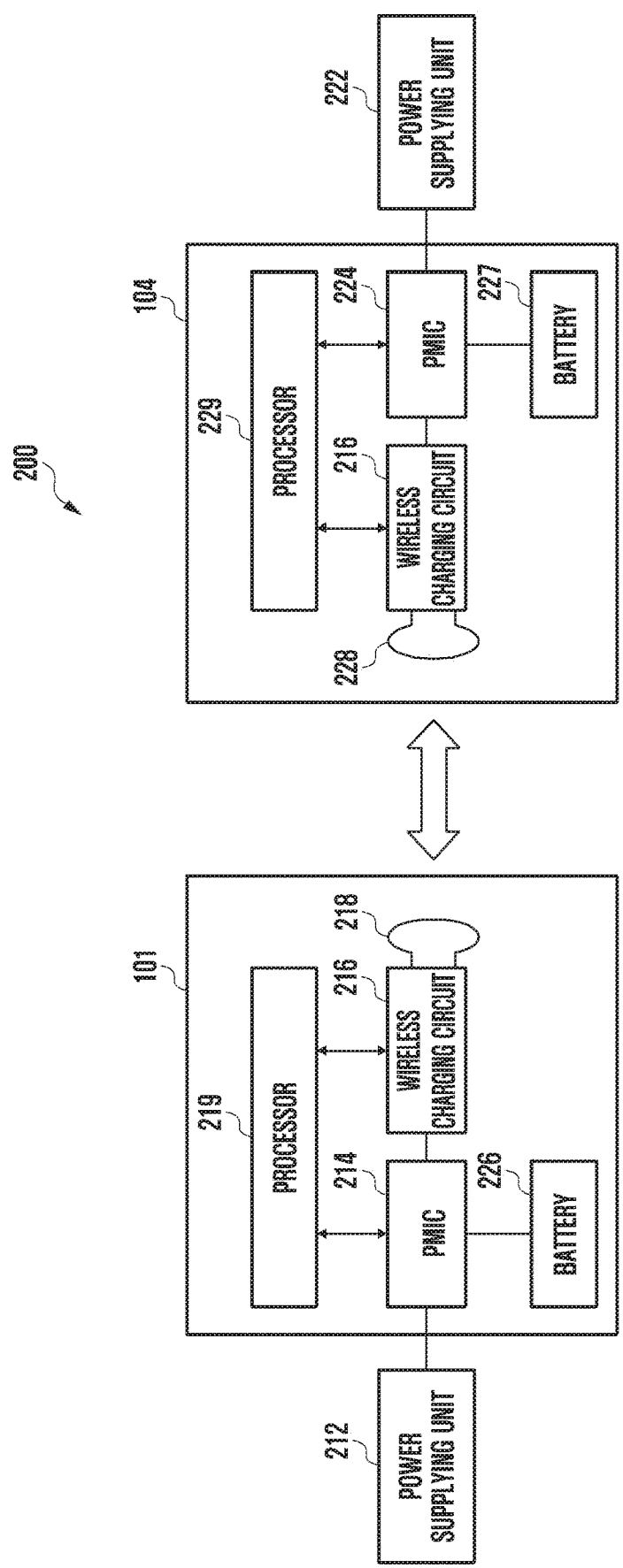
FIG. 2B is a diagram illustrating a wireless charging environment of an electronic device and an external electronic device according to an embodiment of the disclosure.

According to various embodiments, the detection circuit 290 may be included in the power reception circuit 250.fi FIG. 2B is a diagram illustrating a wireless charging environment 400 of an electronic device and the external electronic device 104 according to an embodiment of the disclosure.

Referring to FIG. 2B, the electronic device 101 according to various embodiments may perform wireless power transmission or reception with the external electronic device 104.

According to various embodiments, each of the electronic device 101 and the external electronic device 104 may include a mobile terminal (e.g., a smart phone). The external electronic device 104 may perform wireless power transmission or reception with the electronic device 101.

According to various embodiments, the electronic device 101 may include a wireless charging coil 218, a wireless charging transmission/reception circuit 216, a power management IC (PMIC) 214, a battery 226, a power supplying unit 212, and a processor 219.

According to various embodiments, the external electronic device 104 may include a wireless charging coil 228, a wireless charging transmission/reception circuit 216, a power management IC (PMIC) 224, a battery 227, a power supplying unit 222, and a processor 229, which have different reference numerals but perform the same functions of those of the elements of the electronic device 101, respectively.

Hereinafter, respective functions will be described with reference to the elements of the electronic device 101. A detailed description of the elements of the external electronic device 104 which perform the same functions of those of the elements of the electronic device 101 will be omitted.

According to various embodiments, the wireless charging coil 218 may be implemented in a pattern that winds around a printed circuit board (PCB) in a helix form. The wireless charging coil 218 may perform, for example, functions corresponding to those of the transmission coil 242 and the reception coil 252 of FIG. 2A. The wireless charging coil 218 may transmit power to the external electronic device 104 in the wireless manner. The wireless charging coil 218 may receive power from the external electronic device 104 in the wireless manner.

According to various embodiments, the wireless charging transmission/reception circuit 216 may convert electric energy into a power signal and may transmit the same to the external electronic device 104 via the wireless charging coil 218. The wireless charging transmission/reception circuit 216 may convert a power signal received via the wireless charging coil 218 into electric energy. The wireless charging transmission/reception circuit 216 may provide converted electric energy to the power management IC (PMIC) 214. According to various embodiments, the wireless charging transmission/reception circuit 216 may support at least one of the various wireless charging schemes including, for example, a magnetic resonance scheme or a magnetic induction scheme.

According to various embodiments, the wireless charging transmission/reception circuit 216 may include, for example, the power transmission circuit 210 and the power reception circuit 250 of FIG. 2A. The wireless charging transmission/reception circuit 216 may include a full bridge circuit. The wireless charging transmission/reception circuit 216 may perform control so that the full bridge circuit operates as an inverter (DC→AC) during a wireless power transmission operation using the wireless charging coil 218. The wireless charging transmission/reception circuit 216 may perform control so that the full bridge circuit operates as a rectifier (AC→DC) during a wireless power reception operation using the wireless charging coil 218.

According to various embodiments, the wireless charging transmission/reception circuit 216 may exchange information needed for wireless power transmission/reception with the external electronic device 104 via the inband communication according to the wireless power consortium (WPC) standard. According to the inband communication, the electronic device 101 and the external electronic device 104 may exchange data via modulation of a frequency or an amplitude of a wireless power transmission signal in the state of wireless power transmission between the wireless charging coil 218 of the electronic device 101 and the wireless charging coil 228 of the external electronic device 104. According to various embodiments, the electronic device 101 and the external electronic device 104 may exchange information needed for wireless power transmission or reception via outband communication. The outband communication may use at least one of the various short-range communication schemes, such as Bluetooth, Bluetooth low energy (BLE), Wi-Fi, near field communication (NFC), and the like.

According to various embodiments, the power management IC 214 may receive power from the power supplying unit 212, and may charge the battery 226. The power management IC 214 may monitor a charging current value and a voltage value supplied to the battery 226. When the battery 226 is fully charged, the power management IC 214 may provide, to the processor 219, information indicating that the battery 226 is fully charged.

According to various embodiments, the power management IC 214 may perform a function of charging the battery 226 with power input from the power supplying unit 212 in the wired or wireless manner, a function of communicating with the external power supplying unit 212 connected via a USB terminal, a function of supplying power needed for the electronic device 101, and supplying power appropriate for a voltage level needed for an element such as the wireless charging transmission/reception circuit 216 or the processor 219, or a function of supplying power to the wireless charging transmission/reception circuit 216 in the wireless power transmission mode.

According to various embodiments, the battery 226 may be supplied with power from the power management IC 214. The battery 226 is a device for supplying power to at least one element of the electronic device 101, and may include, for example, a primary battery which is disposable, a secondary battery which is rechargeable, or a fuel battery. The battery 226 may be integrated with the electronic device 101, or may be disposed to be detachable from the electronic device 101.

According to various embodiments, the power supplying unit 212 may supply power needed for the electronic device 101. The power supplying unit 212 may supply power to the electronic device 101 via a travel adaptor (TA) or a USB. The power supplying unit 212 may include an external connection terminal which supports an interface such as a USB charging interface or an on-the-go (OTG) power supplying interface or the like.

According to various embodiments, the processor 219 may be electrically connected to the wireless charging coil 218, the wireless charging transmission/reception circuit 216, the power management IC 214, the battery 226, and the power supplying unit 212 in the electronic device 101, and may control the electronic device 101 overall. The processor 219 may generate various messages needed for performing wireless power transmission or reception with the external electronic device 104. The processor 219 may obtain power (or electric energy) to be transmitted to the external electronic device 104.

According to various embodiments, when the external electronic device 104 (e.g., a smart phone) or an external electronic device (e.g., a watch or an earbud) of FIG. 2A is in contact with or is close to the electronic device 101, the processor 219 may transmit power stored in the battery 226 in the wireless manner using the wireless charging coil 218 and the wireless charging transmission/reception circuit 216. When the electronic device 101 is in contact with, or is close to, the external electronic device 104, the processor 219 may receive power in the wireless manner using the wireless charging coil 218.

Figure 3:
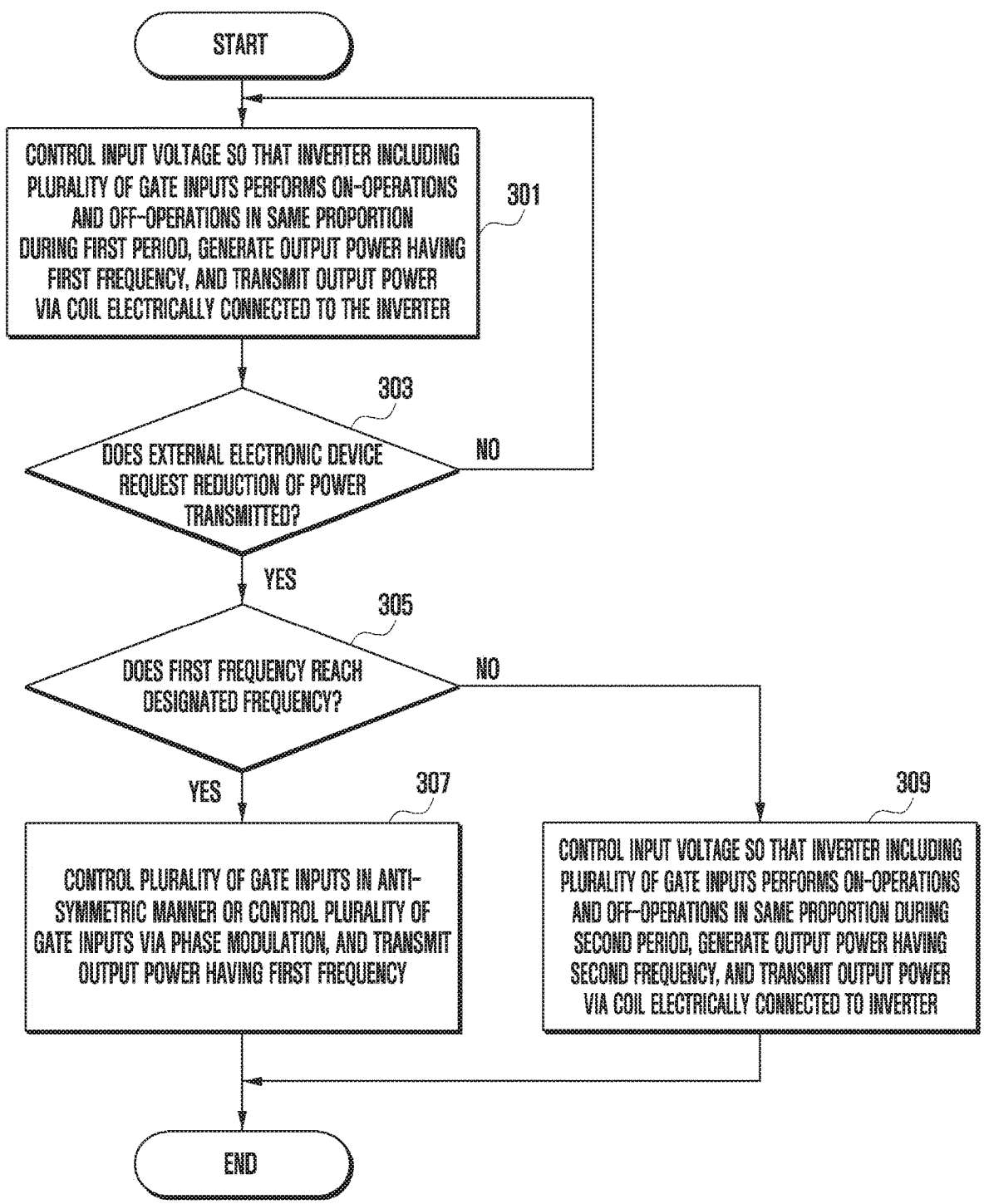
FIG. 3 is a flowchart illustrating a wireless power control method of an electronic device according to an embodiment of the disclosure.

FIG. 3 is a flowchart illustrating a wireless power control method of the electronic device 101 according to an embodiment of the disclosure.

Referring to FIG. 3, according to various embodiments, the electronic device 101 may control an input voltage such that an inverter including a plurality of gate inputs performs ON-operations (turn-on operations) and OFF-operations (turn-off operations) in the same proportion during a first period, may generate output power having a first frequency, and may transmit the output power to an external electronic device (e.g., the electronic device 104) via a coil electrically connected to the inverter, according to the control of the processor 120 or a control circuit (e.g., the power transmission circuit 210 or the wireless charging transmission/reception circuit 216) in operation 301. The inverter including the plurality of gate inputs may be, for example, a full bridge inverter including a plurality of gate inputs.

According to various embodiments, the electronic device 101 may determine whether the external electronic device (e.g., the electronic device 104) requests reduction of transmission power, according to the control of the processor 120 or the control circuit (e.g., the power transmission circuit 210 or the wireless charging transmission/reception circuit 216) in operation 303.

According to various embodiments, while transmitting power to the external electronic device (e.g., the electronic device 104), the electronic device 101 may determine whether the external electronic device (e.g., the electronic device 104) transmits a request for decreasing power transmitted from the electronic device 101, according to the control of the processor 120 or the control circuit (e.g., the power transmission circuit 210 or the wireless charging transmission/reception circuit 216) in operation 303. The electronic device 101 may receive, from the external electronic device (e.g., the electronic device 104), a request for decreasing power transmitted from the electronic device 101 via the communication module 190 (e.g., a transceiver), according to the control of the processor 120 or the control circuit (e.g., the power transmission circuit 210 or the wireless charging transmission/reception circuit 216) in operation 303.

According to various embodiments, the electronic device 101 may exchange information needed for wireless power transmission or reception with the external electronic device 104 via the inband communication according to the wireless power consortium (WPC) standard. According to the inband communication, the electronic device 101 and the external electronic device 104 may exchange data via modulation of a frequency or an amplitude of a wireless power transmission signal in the state of wireless power transmission between the wireless charging coil 218 of the electronic device 101 and the wireless charging coil 228 of the external electronic device 104.

According to various embodiments, the electronic device 101 and the external electronic device 104 may exchange information needed for wireless power transmission or reception via outband communication. The outband communication may use at least one of the various short-range communication schemes, such as Bluetooth, Bluetooth low energy (BLE), Wi-Fi, near field communication (NFC), and the like.

According to various embodiments, the electronic device 101 may receive a request for decreasing power transmitted from the electronic device 101, from an external electronic device (e.g., the electronic device 104) in the form of an electromagnetic wave via a coil or an antenna, according to the control of the processor 120 or the control circuit (e.g., the power transmission circuit 210 or the wireless charging transmission/reception circuit 216) in operation 303. For example, the electronic device 101 may transmit power having a predetermined frequency to an external electronic device (e.g., the electronic device 104) via a coil or an antenna in order to perform charging the external electronic device (e.g., the electronic device 104). In this instance, the electronic device 101 may transmit information to the external electronic device (e.g., the electronic device 104) via a coil or an antenna by applying various modulation schemes, such as frequency shift keying, phase shift keying, amplitude shift keying, and the like, to power having a predetermined frequency. Also, the external electronic device (e.g., the electronic device 104) may transmit information to the electronic device 101 via a coil or an antenna by applying various modulation schemes, such as frequency shift keying, phase shift keying, amplitude shift keying, and the like, to power having a predetermined frequency.

According to various embodiments, there is a section where secondary charging is performed up to a predetermined current, when a voltage reaches a cut-off voltage while the external electronic device (e.g., the electronic device 104) charges a battery (e.g., the battery 259 or 227) with power transferred from the electronic device 101. The section is called a CV section. When the external electronic device (e.g., the electronic device 104) enters the CV section, the external electronic device may request the electronic device 101 to reduce power to be transmitted.

According to various embodiments, the external electronic device (e.g., the electronic device 104) may request the electronic device 101 to reduce power to be transmitted when charging the battery (e.g., the battery 259 or 227) of the external electronic device is completed using the power transferred from the electronic device 101.

According to various embodiments, the external electronic device (e.g., the electronic device 104) may request the electronic device 101 to reduce power to be transmitted when heat is generated while the battery of the external electronic device (e.g., the battery 259 or 227) is being charged using power transferred from the electronic device 101.

According to various embodiments, while transmitting power to the external electronic device (e.g., the electronic device 104), if the external electronic device (e.g., the electronic device 104) requests reduction of power transmitted from the electronic device 101, the electronic device 101 may proceed with operation 305 according to the control of the processor 120 or the control circuit (e.g., the power transmission circuit 210 or the wireless charging transmission/reception circuit 216).

According to various embodiments, while transmitting power to the external electronic device (e.g., the electronic device 104), if the external electronic device (e.g., the electronic device 104) does not request reduction of power transmitted from the electronic device 101, the electronic device 101 may proceed with operation 301 according to the control of the processor 120 or a control circuit (e.g., the power transmission circuit 210 or the wireless charging transmission/reception circuit 216). Accordingly, the electronic device 101 may control an input voltage so that the inverter including the plurality of gate inputs operates ON-operations and OFF-operations in the same proportion during a first period, may generate output power having a first frequency, and may transmit the output power to the external electronic device (e.g., the electronic device 104) via a coil electrically connected to the inverter.

According to various embodiments, the electronic device 101 may determine whether the first frequency of the output power reaches a designated frequency, according to the control of the processor 120 or the control circuit (e.g., the power transmission circuit 210 or the wireless charging transmission/reception circuit 216) in operation 305. For example, the designated frequency may be 148.5 Khz. The designated frequency may be designated according to the international standard or may be designated by the manufacturer of the electronic device 101.

If it is determined that the first frequency of the output power reaches the designated frequency, the electronic device 101 may proceed with operation 307 according to the control of the processor 120 or the control circuit (e.g., the power transmission circuit 210 or the wireless charging transmission/reception circuit 216).

If it is determined that the first frequency of the output power does not reach the designated frequency, the electronic device 101 may proceed with operation 309 according to the control of the processor 120 or the control circuit (e.g., the power transmission circuit 210 or the wireless charging transmission/reception circuit 216).

If it is determined that the first frequency of the output power reaches the designated frequency, the electronic device 101 may control the plurality of gate inputs in the anti-symmetric manner or may control the plurality of gate inputs via modulation of the phase of the input voltage, and may transmit output power having the first frequency, according to the control of the processor 120 or the control circuit (e.g., the power transmission circuit 210 or the wireless charging transmission/reception circuit 216) in operation 307. In this instance, the output power in operation 307 may be lower than the output power in operation 301.

If it is determined that the first frequency of the output power reaches the designated frequency, the electronic device 101 may control an input voltage such that the inverter including the plurality of gate inputs performs ON-operations and OFF-operations in different proportions during the first period, may generate output power having the first frequency, and may transmit the output power to the external electronic device (e.g., the electronic device 104) via a coil electrically connected to the inverter, according to the control of the processor 120 or the control circuit (e.g., the power transmission circuit 210 or the wireless charging transmission/reception circuit 216).

Figure 6:
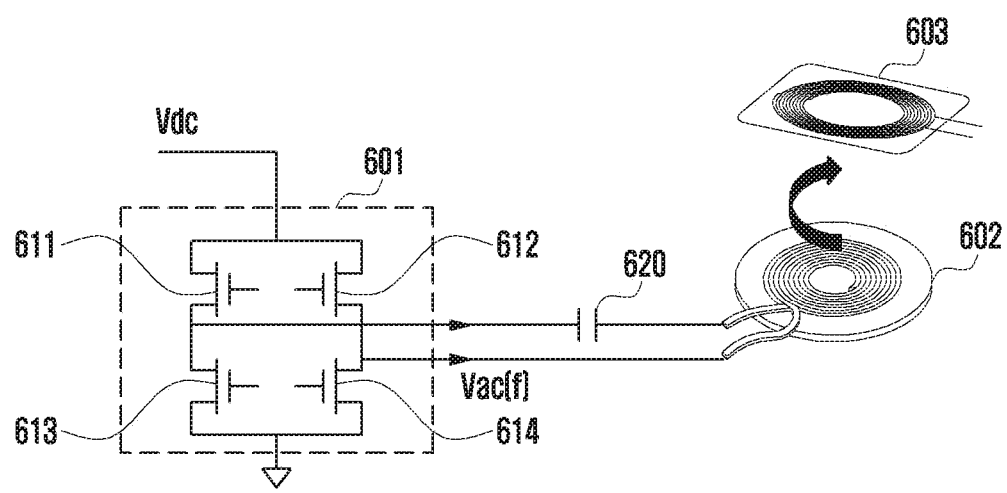
FIG. 6 is a diagram illustrating an inverter including a plurality of gates and a transmission coil of an electronic device according to an embodiment of the disclosure.

Referring to FIG. 6, a description of the case in which the inverter including the plurality of gate inputs performs ON-operations and OFF-operation in different proportions during the first period, will be described. If it is determined that the turned-on time of a field-effect transistor (FET) (e.g., an FET 611 or 614 of FIG. 6) of a first path of an inverter 601 of FIG. 6 is shorter than the turned-on time of a FET (e.g., an FET 612 or 613 of FIG. 6) of a second path by comparing the turned-on time of the FET of the first path and the turned-on time of the FET of the second path, the fact may indicate that the ratio of ON-operations (turn-on operation) to OFF-operations (turn-off operation) of the inverter 601 of FIG. 6 is decreased.

According to various embodiments, the electronic device 101 sets the ratio of ON-operations (turn-on operations) to OFF-operations (turn-off operations) of a plurality of gate inputs (e.g., 50:50) to be higher than a designated ratio, may modulate the phase of the voltage input to the plurality of gate inputs of the inverter, and may generate the output power having the first frequency in operation 307. For example, the electronic device 101 may set the ratio of the turned-on time of the FET (e.g., the FET 611 or 614 of FIG. 6) of the first path to the turned-on time of the FET (e.g., the FET 612 or 613 of FIG. 6) of the second path to 50:50, and may modulate the phase of the voltage input to the gates so that the operation of turning on the FET (e.g., the FET 611 or 614 of FIG. 6) of the first path and the operation of turning on the FET (e.g., the FET 612 or 613 of FIG. 6) of the second path are performed at different points in time.

According to various embodiments, when the electronic device 101 modulates the phase of the voltage input to the plurality of gates of the inverter in operation 307, the ratio of the time of establishing an electric path between the first path to a coil (e.g., a wireless charging coil 228) to the time of establishing an electric path between the second path to a coil (e.g., a wireless charging coil 228) may be changed.

According to various embodiments, in operation 307, the duty rate of the output power having the first frequency may be reduced by controlling a gate input via phase modulation and outputting output power having the first frequency.

If it is determined that the first frequency of the output power does not reach the designated frequency, the electronic device 101 may control an input voltage such that the inverter including the plurality of gate inputs performs ON-operations and OFF-operations in the same proportion during a second period, may generate output power having a second frequency, and may transmit the output power to the external electronic device (e.g., the electronic device 104) via a coil electrically connected to the inverter, according to the control of the processor 120 or the control circuit (e.g., the power transmission circuit 210 or the wireless charging transmission/reception circuit 216) in operation 309. The second frequency may be within a designated frequency range, and may be higher than the first frequency. The first period may be longer than the second period.

Figure 4:
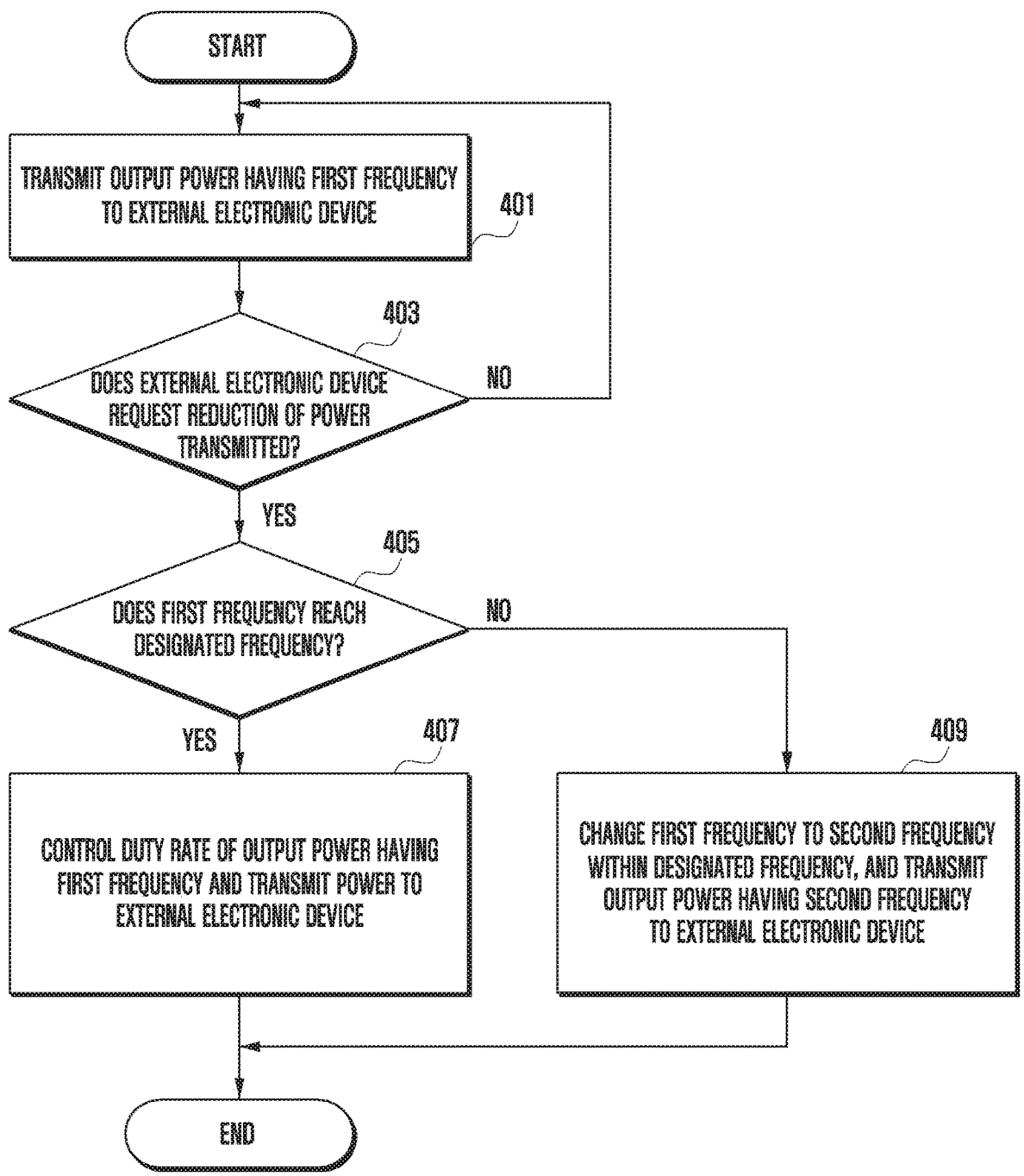
FIG. 4 is a flowchart illustrating a wireless power control method of an electronic device according to an embodiment of the disclosure.

FIG. 4 is a flowchart illustrating a wireless power control method of the electronic device 101 according to an embodiment of the disclosure.

Referring to FIG. 4, according to various embodiments, the electronic device 101 may transmit output power having a first frequency to an external electronic device (e.g., the electronic device 104), according to the control of the processor 120 or a control circuit (e.g., the power transmission circuit 210 or the wireless charging transmission/reception circuit 216) in operation 401. In this instance, the duty rate of the output power having the first frequency may be 50:50.

According to various embodiments, the electronic device 101 may determine whether a request for decreasing transmission power is received from the external electronic device (e.g., the electronic device 104), according to the control of the processor 120 or the control circuit (e.g., the power transmission circuit 210 or the wireless charging transmission/reception circuit 216) in operation 403.

According to various embodiments, while transmitting power to the external electronic device (e.g., the electronic device 104), if the external electronic device (e.g., the electronic device 104) requests reduction of power to be transmitted from the electronic device 101, the electronic device 101 may proceed with operation 405 according to the control of the processor 120 or a control circuit (e.g., the power transmission circuit 210 or the wireless charging transmission/reception circuit 216).

According to various embodiments, there is a section where secondary charging is performed up to a predetermined current, when the voltage reaches a cut-off voltage, while the external electronic device (e.g., the electronic device 104) charges a battery (e.g., the battery 259 or 227) with power transferred from the electronic device 101. The section is called a CV section. When the external electronic device (e.g., the electronic device 104) enters the CV section, the external electronic device may request the electronic device 101 to reduce power to be transmitted.

According to various embodiments, the external electronic device (e.g., the electronic device 104) may request the electronic device 101 to reduce power to be transmitted when charging the battery (e.g., the battery 259 or 227) of the external electronic device is completed using the power transferred from the electronic device 101.

According to various embodiments, the external electronic device (e.g., the electronic device 104) may request the electronic device 101 to reduce power to be transmitted when heat is generated while the battery of the external electronic device (e.g., the battery 259 or 227) is being charged using power transferred from the electronic device 101.

According to various embodiments, while the electronic device 101 transmits power to the external electronic device (e.g., the electronic device 104), if the external electronic device (e.g., the electronic device 104) does not request reduction of power transmitted from the electronic device 101, the electronic device 101 may proceed with operation 401 according to the control of the processor 120 or the control circuit (e.g., the power transmission circuit 210 or the wireless charging transmission/reception circuit 216), so as to transmit the output power having the first frequency to the external electronic device (e.g., the electronic device 104).

According to various embodiments, the electronic device 101 may determine whether the first frequency of the output power reaches a designated frequency according to the control of the processor 120 or the control circuit (e.g., the power transmission circuit 210 or the wireless charging transmission/reception circuit 216) in operation 405. For example, the designated frequency may be 148.5 Khz. The designated frequency may be designated according to the international standard or may be designated by the manufacturer of the electronic device 101.

If it is determined that the first frequency of the output power reaches the designated frequency, the electronic device 101 may proceed with operation 407 according to the control of the processor 120 or the control circuit (e.g., the power transmission circuit 210 or the wireless charging transmission/reception circuit 216).

If it is determined that the first frequency of the output power does not reach the designated frequency, the electronic device 101 may proceed with operation 409 according to the control of the processor 120 or the control circuit (e.g., the power transmission circuit 210 or the wireless charging transmission/reception circuit 216).

If it is determined that the first frequency of the output power reaches the designated frequency, the electronic device 101 may adjust the duty rate of the output power having the first frequency and may transmit the output power to the external electronic device (e.g., the electronic device 104), according to the control of the processor 120 or the control circuit (e.g., the power transmission circuit 210 or the wireless charging transmission/reception circuit 216) in operation 407. In this instance, the duty rate of the output power having the first frequency may be adjusted from 50:50 to a range of 30:70 to 35:65.

If it is determined that the first frequency of the output power does not reach the designated frequency, the electronic device 101 may change the frequency of the output power from the first frequency to a second frequency within a designated frequency range, and may transmit output power having the second frequency to the external electronic device (e.g., the electronic device 104), according to the control of the processor 120 or the control circuit (e.g., the power transmission circuit 210 or the wireless charging transmission/reception circuit 216) in operation 409. The second frequency may be within the designated frequency range, and may be higher than the first frequency. In this instance, the duty rate of the output power having the second frequency may be 50:50.

Figure 5:
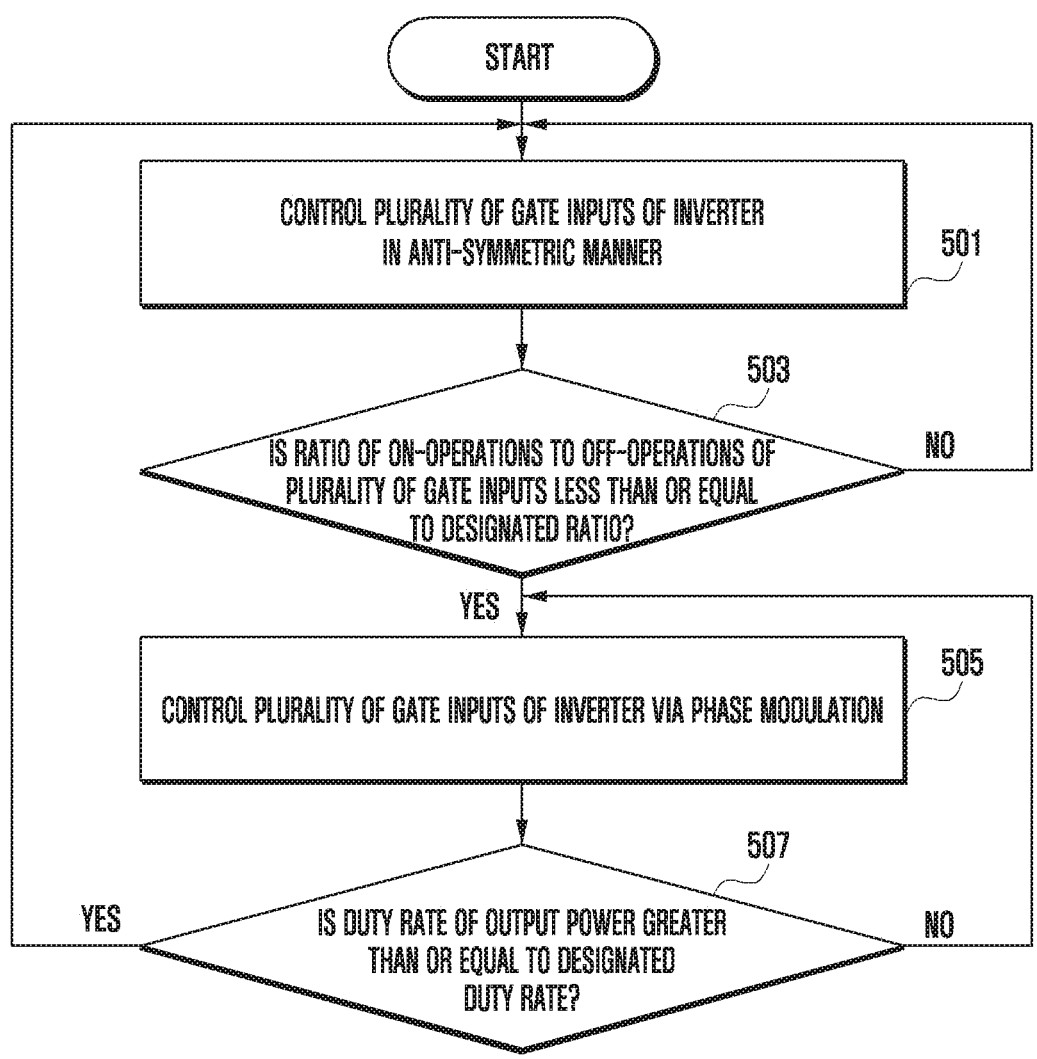
FIG. 5 is a flowchart illustrating operation 307 of FIG. 3 according to an embodiment of the disclosure.

FIG. 5 is a flowchart illustrating an operation of generating output power having a first frequency by controlling an input voltage so that an inverter including a plurality of gate inputs perform ON-operations (turn-on operations) and OFF-operations (turn-off operations) in different proportions during a first period, which has been described in operation 307 of FIG. 3 according to an embodiment of the disclosure.

According to various embodiments, the electronic device 101 may generate output power having a first frequency by controlling the plurality of gate inputs of the inverter in the anti-symmetric manner, according to the control of the processor 120 or the control circuit (e.g., the power transmission circuit 210 or the wireless charging transmission/reception circuit 216) in operation 501.

According to various embodiments, when a request for reduction of output power is received from the external electronic device 104, the electronic device 101 may generate output power having the first frequency by controlling the plurality of gate inputs of the inverter in the anti-symmetric manner, according to the control of the processor 120 or the control circuit (e.g., the power transmission circuit 210 or the wireless charging transmission/reception circuit 216) in operation 501.

According to various embodiments, the electronic device 101 may change the ratio of the turned-on time of an FET (e.g., the FET 611 or 614 of FIG. 6) of a first path of the inverter 601 of FIG. 6 to the turned-on time of an FET (e.g., the FET 612 or 613 of FIG. 6) of a second path.

According to various embodiments, the electronic device 101 may control the plurality of gate inputs of the inverter in the anti-symmetric manner by applying different turned-on time (or turned-on power) ratios to the plurality of gates of the inverter.

According to various embodiments, the electronic device 101 may determine whether the ratio of ON-operations (turn-on operations) to OFF-operations (turn-off operations) of the plurality of gate inputs is less than or equal to a designated ratio, according to the control of the processor 120 or the control circuit (e.g., the power transmission circuit 210 or the wireless charging transmission/reception circuit 216) in operation 503.

According to various embodiments, when a request for reduction of output power is received from the external electronic device 104, the electronic device 101 may determine whether the ratio of ON-operations (turn-on operations) to OFF-operations (turn-off operations) of the plurality of gate inputs is less than or equal to the designated ratio, according to the control of the processor 120 or the control circuit (e.g., the power transmission circuit 210 or the wireless charging transmission/reception circuit 216) in operation 503.

According to various embodiments, the electronic device 101 may determine whether the duty rate of the output power from the inverter is less than or equal to a first designated duty rate, according to the control of the processor 120 or the control circuit (e.g., the power transmission circuit 210 or the wireless charging transmission/reception circuit 216) in operation 503.

According to various embodiments, when a request for reduction of output power is received from the external electronic device 104, the electronic device 101 may determine whether the duty rate of the output power from the inverter is less than or equal to the first designated duty rate, according to the control of the processor 120 or the control circuit (e.g., the power transmission circuit 210 or the wireless charging transmission/reception circuit 216) in operation 503.

According to various embodiments, the first designated duty rate in operation 503 may be 30:70, which is the ratio of the power that is transferred to a coil after being output from the inverter to the power that is not transferred to the coil during the first period.

According to various embodiments, the designated ratio may be 30:70, which is the ratio of ON-operations (turn-on operations) to OFF-operations (turn-off operations) during the first period. The electronic device 101 may determine whether the ratio of ON-operations (turn-on operations) to OFF-operations (turn-off operations) of the plurality of gate inputs is 30:70 during the first period, according to the control of the processor 120 or the control circuit (e.g., the power transmission circuit 210 or the wireless charging transmission/reception circuit 216) in operation 503.

According to various embodiments, if it is determined that the ratio of ON-operations (turn-on operations) to OFF-operations (turn-off operations) of the plurality of gate inputs exceeds the designated ratio, the electronic device 101 may proceed with operation 501 according to the control of the processor 120 or the control circuit (e.g., the power transmission circuit 210 or the wireless charging transmission/reception circuit 216).

According to various embodiments, it is determined that the ratio of ON-operations (turn-on operations) to OFF-operations (turn-off operations) of the plurality of gate inputs is less than or equal to the designated ratio, the electronic device 101 may proceed with operation 505 according to the control of the processor 120 or the control circuit (e.g., the power transmission circuit 210 or the wireless charging transmission/reception circuit 216).

According to various embodiments, the electronic device 101 may generate output power having the first frequency by modulating the phase of the voltage input to the plurality of gate inputs of the inverter according to the control of the processor 120 or the control circuit (e.g., the power transmission circuit 210 or the wireless charging transmission/reception circuit 216) in operation 505. The output power in operation 505 may be lower than the output power in operation 501.

According to various embodiments, when a request for reduction of output power is received from the external electronic device 104, the electronic device 101 may generate output power having the first frequency by modulating the phase of the voltage input to the plurality of gate inputs of the inverter according to the control of the processor 120 or the control circuit (e.g., the power transmission circuit 210 or the wireless charging transmission/reception circuit 216) in operation 505.

According to various embodiments, in operation 505, the electronic device 101 may set the ratio of ON-operations (turn-on operation) to OFF-operations (turn-off operation) of the plurality of gate inputs (e.g., 50:50) to be higher than the designated ratio, may modulate the phase of the voltage of input to the plurality of gate inputs of the inverter, and may generate the output power having the first frequency. For example, the electronic device 101 may set the ratio of the turned-on time of the FET (e.g., the FET 611 or 614 of FIG. 6) of a first path of the inverter 601 of FIG. 6 to the turned-on time of the FET (e.g., the FET 612 or 613 of FIG. 6) of a second path to 50:50, and may modulate the phase of the voltage input to the gates so that the operation of turning on the FET (e.g., the FET 611 or 614 of FIG. 6) of the first path and the operation of turning on the FET (e.g., the FET 612 or 613 of FIG. 6) of the second path may be performed at different points in time.

According to various embodiments, when the electronic device 101 may modulate the phase of the voltage input to the plurality of gates of the inverter in operation 505, the ratio of the time of establishing an electric path of the first path to a coil (e.g., the coil 228) to the time of establishing an electric path of the second path to the coil may be changed.

According to various embodiments, the electronic device 101 may determine whether the duty rate of the output power from the inverter is greater than or equal to a designated duty rate according to the control of the processor 120 or the control circuit (e.g., the power transmission circuit 210 or the wireless charging transmission/reception circuit 216) in operation 507.

According to various embodiments, the electronic device 101 may determine whether the duty rate of the output power from the inverter is greater than or equal to a second designated duty rate according to the control of the processor 120 or the control circuit (e.g., the power transmission circuit 210 or the wireless charging transmission/reception circuit 216) in operation 507.

According to various embodiments, when a request for reduction of output power is received from the external electronic device 104, the electronic device 101 may determine whether the duty rate of the output power from the inverter is greater than or equal to the second designated duty rate, according to the control of the processor 120 or the control circuit (e.g., the power transmission circuit 210 or the wireless charging transmission/reception circuit 216) in operation 507.

According to various embodiments, the designated duty rate in operation 507 may be 35:65, which is the ratio of the power that is transferred to a coil after being output from the inverter to the power that is not transferred to the coil, during the first period. The electronic device 101 may determine whether the duty rate of the output power of the inverter during the first period is 35:65 according to the control of the processor 120 or the control circuit (e.g., the power transmission circuit 210 or the wireless charging transmission/reception circuit 216) in operation 507.

According to various embodiments, if it is determined that the duty rate of the output power is greater than or equal to the designated duty rate, the electronic device 101 may proceed with operation 501 according to the control of the processor 120 or the control circuit (e.g., the power transmission circuit 210 or the wireless charging transmission/reception circuit 216).

According to various embodiments, if it is determined that the duty rate of the output power is less than or equal to the designated duty rate, the electronic device 101 may proceed with operation 505 according to the control of the processor 120 or the control circuit (e.g., the power transmission circuit 210 or the wireless charging transmission/reception circuit 216).

FIG. 6 is a diagram illustrating the inverter 601 including a plurality of gates and a transmission coil 602 of the electronic device 101 according to an embodiment of the disclosure.

The inverter 601 including the plurality of gates may be a full-bridge inverter including a plurality of field-effect transistors (FET) 611, 612, 613, and 614. The first FET 611 is connected to the third FET 613 in series, and the second FET 612 is connected to the fourth FET 614 in series. A constant voltage (Vdc) is provided to the drain of the first FET 611 and the second FET 612. The source of the third FET 613 and the fourth FET 614 may be grounded. A node to which the first FET 611 and the third FET 613 are connected, and a node to which the second FET 612 and the fourth FET 614 are connected may generate an output voltage (Vac(f)) having a predetermined frequency via a capacitor 620 and the transmission coil 602. The first electronic device 101 may generate output power (Vac(f)) having a predetermined frequency by controlling a gate input voltage of the first FET 611, the second FET 612, the third FET 613, and the fourth FET 614, and may transmit the power to an external electronic device (e.g., the electronic device 104) via the transmission coil 602. The external electronic device (e.g., the electronic device 104) may receive power via a reception coil 603.

Figure 7:
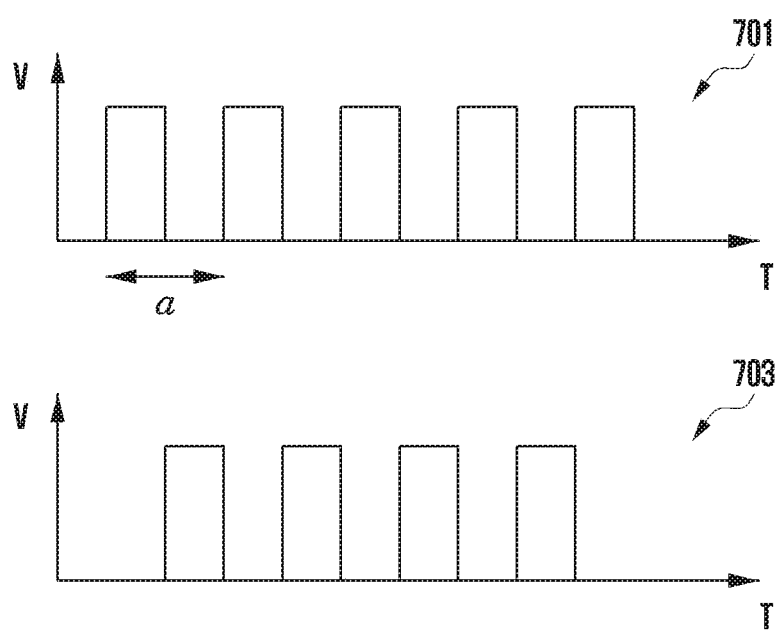
FIG. 7 shows time-voltage graphs illustrating a wireless power control method of an electronic device according to an embodiment of the disclosure.
Figure 8:
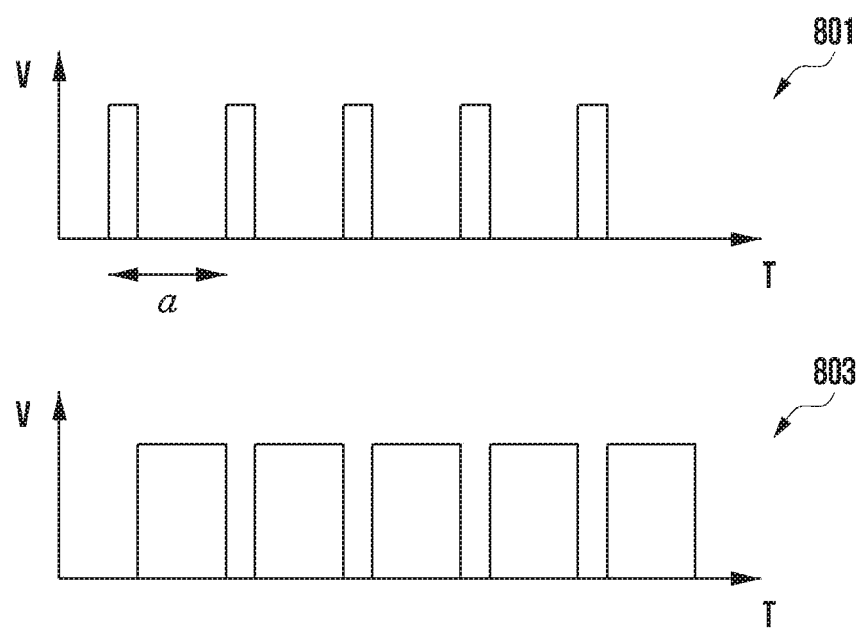
FIG. 8 shows time-voltage graphs illustrating a wireless power control method of an electronic device according to an embodiment of the disclosure.
Figure 9:
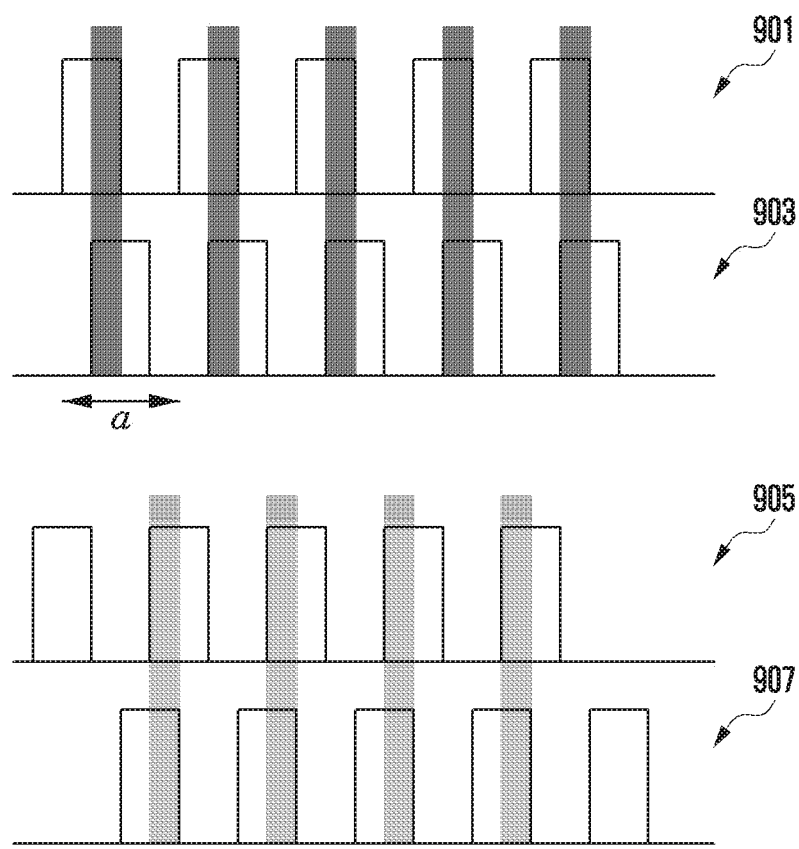
FIG. 9 shows time-voltage graphs illustrating a wireless power control method of an electronic device according to an embodiment of the disclosure.

FIG. 7 shows time-voltage graphs illustrating a wireless power control method of the electronic device 101 according to an embodiment of the disclosure, FIG. 8 shows time-voltage graphs illustrating a wireless power control method of the electronic device 101 according to an embodiment of the disclosure, and FIG. 9 shows time-voltage graphs illustrating a wireless power control method of the electronic device 101 according to an embodiment of the disclosure.

Referring to FIGS. 3, 5, and 6, graphs 701 and 703 of FIG. 7 are associated with an operation of controlling the inverter 601 including a plurality of gates in the same proportion during a first period (a).

In the graph 701, a high voltage (FET turn-on voltage) is provided to the gate of the first FET 611 and the gate of the fourth FET 614. In parallel, a low voltage (FET turn-off voltage) is provided to the gate of the second FET 612 and the gate of the third FET 613 in the graph 703.

In the graph 701, a high voltage may be provided to the gate of the first FET 611 and the gate of the fourth FET 614, and then a low voltage may be provided to the gate of the first FET 611 and the gate of the fourth FET 614. In parallel, a low voltage may be provided to the gate of the second FET 612 and the gate of the third FET 613, and then a high voltage may be provided to the gate of the second FET 612 and the gate of the third FET 613, in operation 703.

In this instance, the voltage is provided to the first FET 611, the second FET 612, the third FET 613, and the fourth FET 614 on the basis of the same time ratio, and thus, the duty rate of the output power or the duty rate of a square wave based on an input voltage may be 50.

Referring to FIG. 8, the graphs 801 and 803 are associated with controlling the inverter 601 including a plurality of gates in different proportions (or in the anti-symmetric manner) during a first period (a).

In graph 801, a high voltage (FET turn-on voltage) is provided to the gate of the first FET 611 and the gate of the fourth FET 614. In parallel, a low voltage (FET turn-off voltage) is provided to the gate of the second FET 612 and the gate of the third FET 613 in operation 803.

In operation 801, a high voltage may be provided to the gate of the first FET 611 and the gate of the fourth FET 614, and then a low voltage may be provided to the gate of the first FET 611 and the gate of the fourth FET 614. In parallel, a low voltage may be provided to the gate of the second FET 612 and the gate of the third FET 613, and then a high voltage may be provided to the gate of the second FET 612 and the gate of the third FET 613, in operation 803.

In this instance, the voltage (e.g., a high voltage) is provided to the gates of the first FET 611, the second FET 612, the third FET 613 and the fourth FET 614 on the basis of different time ratios, and thus, the duty rate of the output power or the duty rate of a square wave based on an input voltage may be less than 50 (e.g., 30).

Referring to FIG. 9, the graphs 901, 903, 905, and 907 are associated with an operation of controlling the inverter 601 including a plurality of gates via phase modulation.

In the graph 901, a high voltage is provided to the gate of the first FET 611. In the graph 903, a high voltage may be provided to the gate of the fourth FET 614 a predetermined period of time after a high voltage is provided to the gate of the first FET 611.

In the graphs 901 and 903, only when the first FET 611 and the fourth FET 614 are turned on together (overlapping parts in the drawing), the inverter 601 operates and generates power.

Also, a high voltage is provided to the gate of the first FET 611 in the graph 901, and in parallel, a low voltage is provided to the gate of the second FET 612 in the graph 905. A high voltage is provided to the gate of the fourth FET 614 in the graph 903, and in parallel, a low voltage is provided to the gate of the third FET 613 in the graph 907. In the graphs 905 and 907, only when the second FET 612 and the third FET 613 are turned on together (overlapping parts in the drawing), the inverter 601 operates and generates power. Therefore, the first FET 611 and the fourth FET 614 are turned on together or the second FET 612 and the third FET 613 are turned on together, during a period corresponding to a predetermined difference in time (or a predetermined difference in phase) therebetween. In this instance, the duty rate of the output power or the duty rate of a square wave based on an input voltage may be less than 50 (e.g., 30).

Figure 10:
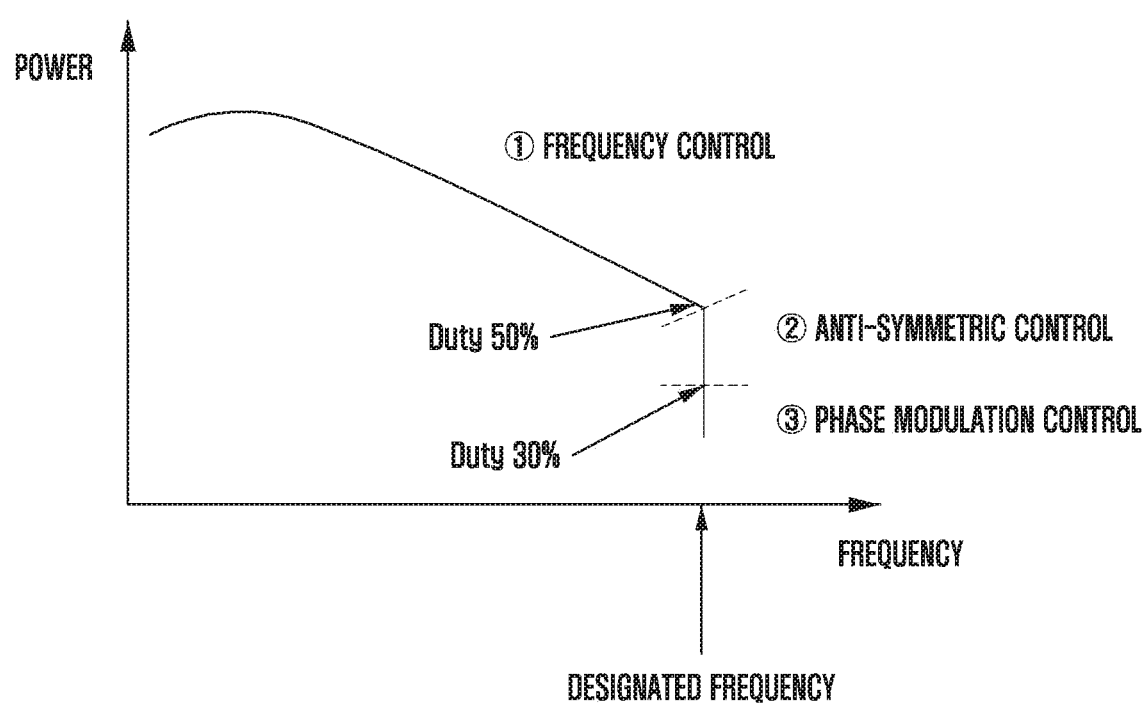
FIG. 10 is a frequency-power graph illustrating a wireless power control method of an electronic device according to an embodiment of the disclosure.

FIG. 10 is a frequency-power graph illustrating a wireless power control method of the electronic device 101 according to an embodiment of the disclosure.

Referring to FIG. 10, the electronic device 101 may increase the frequency of output power up to a designated frequency (e.g., 148.5 Khz) and decrease the level of the output power, in order to control the output power transmitted to an external electronic device (e.g., the electronic device 104).

When the frequency of the output power reaches the designated frequency (e.g., 148.5 Khz), the electronic device 101 may control a plurality of gate inputs of an inverter in the anti-symmetric manner, and may generate output power having a first frequency. Also, the electronic device 101 may generate output power having a first frequency by modulating the phase of the voltage input to the plurality of gate inputs of the inverter. According to various embodiments, the electronic device 101 may change the ratio of the turned-on time of an FET (e.g., the FET 611 or 614 of FIG. 6) of a first path of the inverter 601 of FIG. 6 to the turned-on time of an FET (e.g., the FET 612 or 613 of FIG. 6) of a second path, in order to control the plurality of gate inputs of the inverter in the anti-symmetric manner. The ratio of the turned-on time of the FET (e.g., the FET 611 or 614 of FIG. 6) of the first path of the inverter 601 of FIG. 6 to the turned-on time of the FET (e.g., the FET 612 or 613 of FIG. 6) of the second path may be 30:70.

Figure 11:
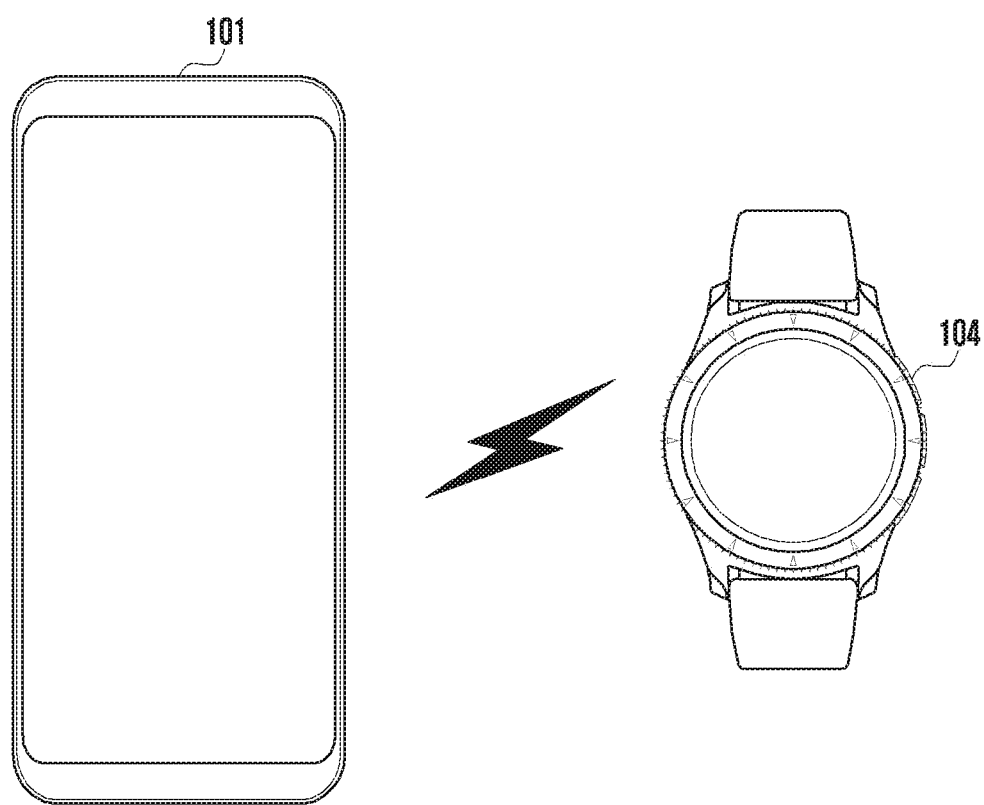
FIG. 11 is a diagram illustrating an electronic device and an external electronic device according to an embodiment of the disclosure.
Figure 12:
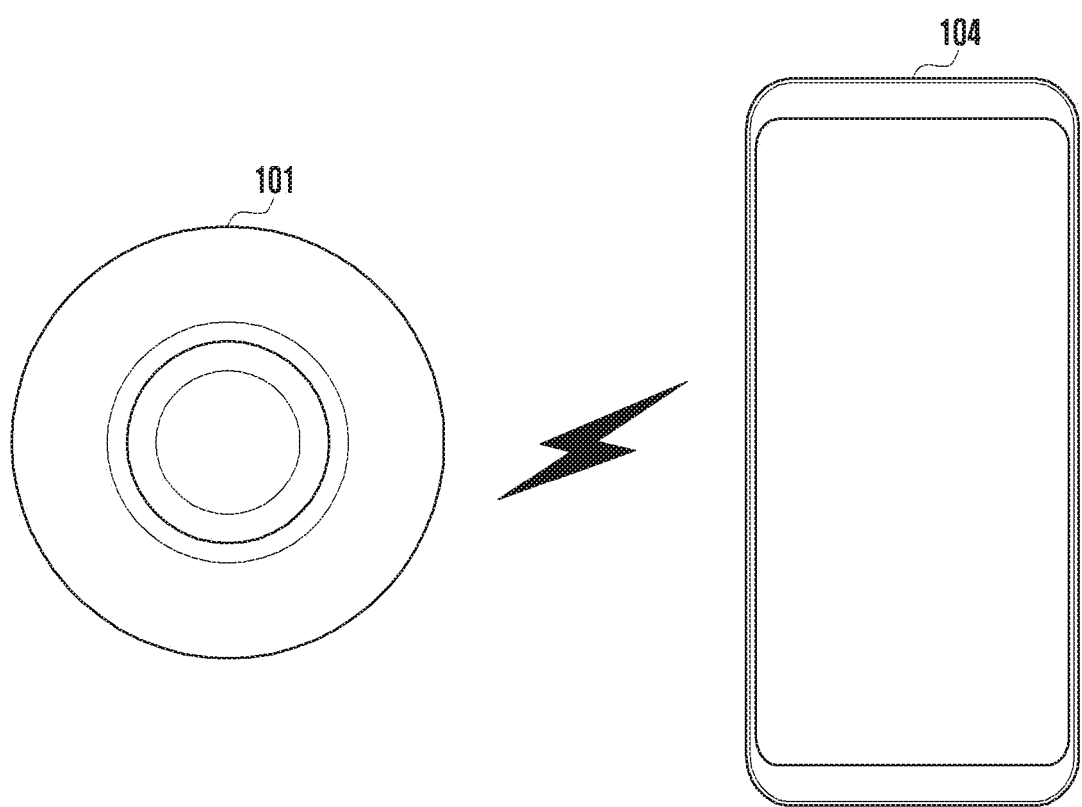
FIG. 12 is a diagram illustrating an electronic device and an external electronic device according to an embodiment of the disclosure.

FIG. 11 is a diagram illustrating the electronic device 101 and the external electronic device 104 according to an embodiment of the disclosure, and FIG. 12 is a diagram illustrating the electronic device 101 and the external electronic device 104 according to an embodiment of the disclosure.

Referring to FIG. 11, the electronic device 101 that transmits power may be a mobile terminal, and the external electronic device 104 that receives power may be one of the various wearable devices or mobile terminals.

Referring to FIG. 12, the electronic device 101 that transmits power may be a charging pad, and the external electronic device 104 that receives power may be one of the various wearable devices or mobile terminals.

An electronic device according to various embodiments disclosed herein may be various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a coil;
   an inverter including a plurality of gate inputs which are electrically connected to the coil; and
   at least one processor configured to:
   control the plurality of gate inputs of the inverter in an anti-symmetric manner to generate an output power,
   receive an output power reduction request from an external electronic device, based on receiving the output power reduction request, determine whether a ratio of ON-operations to OFF-operation of the plurality of gate inputs of the inverter is less than or equal to a designated ratio, and based on the ratio of ON-operations to OFF-operations of the plurality of gate inputs of the inverter being less than or equal to the designated ratio, modulate a phase of a voltage input into the plurality of gate inputs of the inverter to generate the output power.

2. The electronic device of claim 1, wherein the at least one processor is further configured to:
control the plurality of gate inputs of the inverter in the anti-symmetric manner by applying different turned-on time ratios to a plurality of gates, with respect to the plurality of gate inputs of the inverter.

3. The electronic device of claim 1, wherein the at least one processor is further configured to:
determine whether a duty rate of the output power output from the inverter is greater than or equal to a designated duty rate, and
based on the duty rate of the output power being greater than or equal to the designated duty rate, control the plurality of gate inputs of the inverter in the anti-symmetric manner to generate the output power.

4. The electronic device of claim 1, wherein, based on the ratio of ON-operations to OFF-operations of the plurality of gate inputs of the inverter being less than or equal to the designated ratio, the at least one processor is further configured to:
control an input voltage to enable the inverter to perform ON-operations and OFF-operations in the same proportion based on modulating a phase of a voltage input to the plurality of gate inputs of the inverter, and
modulate the phase of the voltage input to the plurality of gate inputs.

5. The electronic device of claim 1, wherein the output power reduction request is received based on at least one of:
a battery of the external electronic device entering a CV section,
the battery of the external electronic device being fully charged, or
heat being generated from the external electronic device.

6. The electronic device of claim 1, wherein, based on the output power reduction request being received, the at least one processor is further configured to determine whether a frequency of the output power falls within a designated frequency range.

7. The electronic device of claim 1, wherein an output power generated by controlling the plurality of gate inputs of the inverter in the anti-symmetric manner is higher than the output power generated by modulating a phase of a voltage input into the plurality of gate inputs of the inverter.

8. The electronic device of claim 1, wherein the at least one processor is further configured to receive the output power reduction request from the electronic device via inband communication.

9. The electronic device of claim 1, wherein the at least one processor is further configured to receive the output power reduction request from the electronic device via outband communication.

10. A power control method for wireless charging of an electronic device, the method comprising:
generating an output power by controlling a plurality of gate inputs of an inverter in an anti-symmetric manner;
receiving an output power reduction request from an external electronic device;

based on the output power reduction request being received, determining whether a ratio of ON-operations to OFF-operations of the plurality of gate inputs of the inverter is less than or equal to a designated ratio; and
based on the ratio of ON-operations to OFF-operations of the plurality of gate inputs of the inverter being less than or equal to the designated ratio, generating the output power by modulating a phase of a voltage input to the plurality of gate inputs of the inverter.

11. The method of claim 10, wherein the generating of the output power by controlling the plurality of gate inputs of the inverter in the anti-symmetric manner comprises:
controlling the plurality of gate inputs of the inverter in the anti-symmetric manner by applying different turned-on time ratios to a plurality of gates, with respect to the plurality of gate inputs of the inverter.

12. The method of claim 10, further comprising:
determining whether a duty rate of an output power output from the inverter is greater than or equal to a designated duty rate; and
based on a determination that the duty rate of the output power is greater than or equal to the designated duty rate, generating the output power by controlling the plurality of gate inputs of the inverter in the anti-symmetric manner.

13. The method of claim 10, further comprising:
based on the ratio of ON-operations to OFF-operations of the plurality of gate inputs of the inverter being less than or equal to the designated ratio,
controlling an input voltage to enable the inverter to perform ON-operations and OFF-operations in the same proportion based on modulating a phase of a voltage input into the plurality of gate inputs of the inverter, and
modulating the phase of the voltage input into the plurality of gate inputs.

14. The method of claim 10, wherein the output power reduction request is received based on at least one of:
a battery of the external electronic device entering a CV section,
the battery of the external electronic device being fully charged, or
heat being generated from the external electronic device.

15. The method of claim 10, further comprising:
based on the output power reduction request being received, determining whether a frequency of the output power falls within a designated frequency range.

16. The method of claim 10, wherein the output power generated by controlling the plurality of gate inputs of the inverter in the anti-symmetric manner is higher than the output power generated by modulating a phase of a voltage input into the plurality of gate inputs of the inverter.

17. The method of claim 10, further comprising:
receiving the output power reduction request from the electronic device via inband communication.

18. The method of claim 10, further comprising:
receiving the output power reduction request from the electronic device via outband communication.

19. An electronic device, comprising:
a coil;
an inverter including a plurality of gate inputs electrically connected to the coil;
at least one processor configured to:
generate an output power having a first frequency by controlling an input voltage to enable the inverter to perform ON-operations and OFF-operations in the same proportion, receive a request for reducing the output power from an external electronic device, and based on the request for reducing the output power being received, generate an output power having a first frequency by controlling an input voltage to enable the inverter to perform ON-operations and OFF-operations in different proportions, and transmit the output power to the external electronic device via the coil.

* * * * *